Dec. 1, 1942.  H. H. SNYDER  2,303,587
CONVEYING APPARATUS
Filed March 3, 1942  2 Sheets-Sheet 1
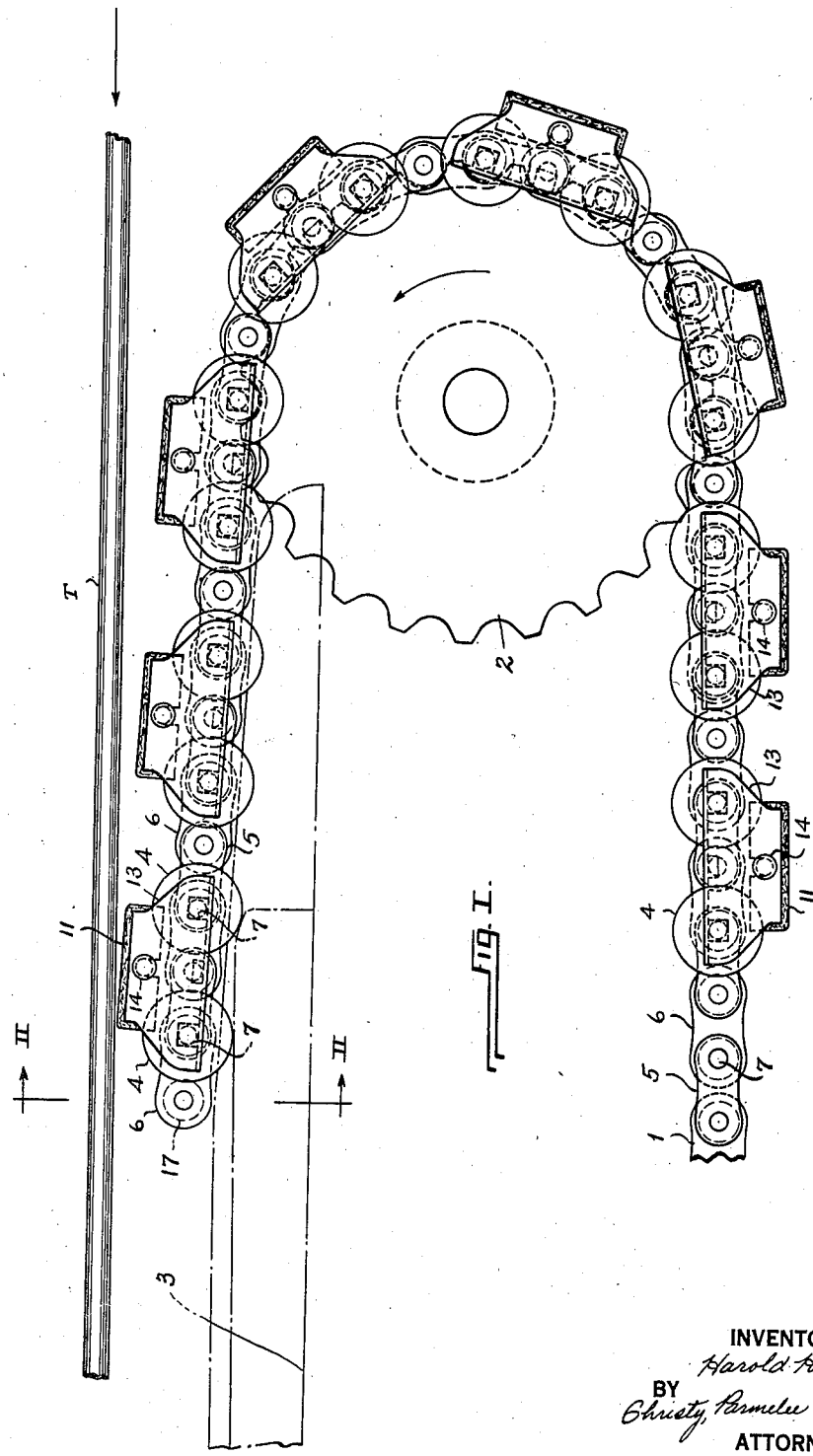
INVENTOR
Harold H. Snyder
BY Christy, Parmelee and Strickland
ATTORNEYS Dec. 1, 1942.   H. H. SNYDER   2,303,587
CONVEYING APPARATUS
Filed March 3, 1942   2 Sheets-Sheet 2
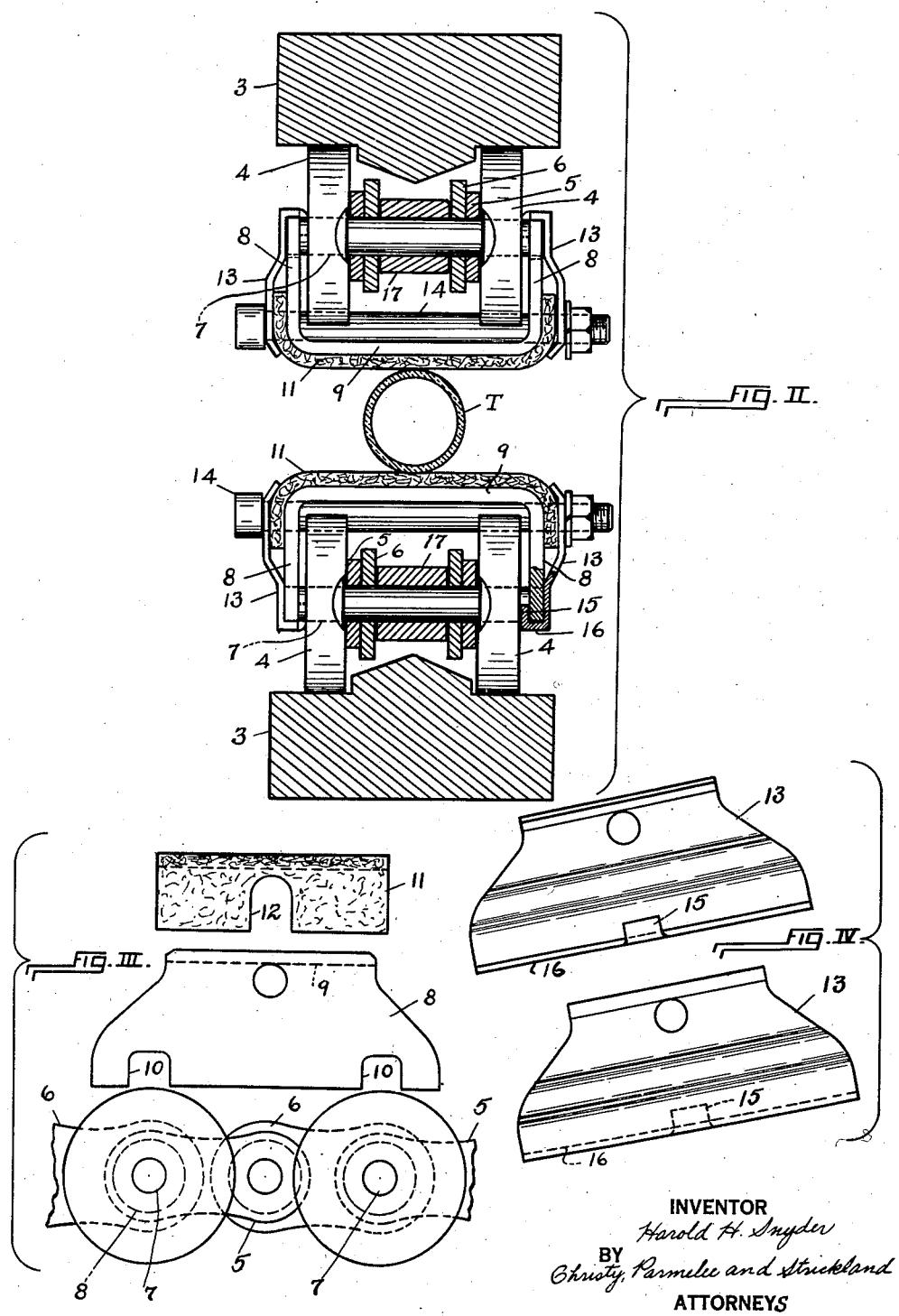
INVENTOR
Harold H. Snyder
BY
Christy, Parmelee and Strickland
ATTORNEYS Patented Dec. 1, 1942

2,303,587

UNITED STATES PATENT OFFICE 2,303,587

CONVEYING APPARATUS

Harold H. Snyder, Mount Lebanon, Pa., assignor to Forter-Teichmann Company, Pittsburgh, Pa., a corporation of Pennsylvania Application March 3, 1942, Serial No. 433,126

4 Claims. (Cl. 198—195)

This invention relates to conveying apparatus, and has specifically to do with the feeding of newly formed and still hot and soft glass shapes, such as rods and tubing, to fabricating apparatus, such as apparatus for severing advancing material into a succession of pieces of predetermined length. Feeding apparatus of the nature and for the purpose indicated is shown and described in an application for United States Letters Patent, filed by me January 23, 1942, Serial 427,917. It is in such apparatus that I have developed my present invention. It will, however, be manifest that the improvement in conveying apparatus here shown and described is applicable to sprocket-chain conveyors generally; and that, with respect to the material conveyed and the apparatus to which the material is fed, the showing here made is merely exemplary.

In the accompanying drawings Fig. I is a view in side elevation of a portion of a sprocket-chain conveyor in which the improvement of the present invention is incorporated. Fig. II is a view to larger scale, showing in vertical and transverse section the co-operating adjacent reaches of two sprocket chains of the invention in engagement with work. Fig. II includes a detail of clip structure also shown in vertical section.

Figs. III and IV are diagrammatic views of details, shown in elevation.

Conveying apparatus to which the invention is applicable includes a pair of endless chains 1, mounted upon and driven by sprocket-wheels 2. The two chains are arranged with adjacent reaches in parallelism, and, engaging the work upon opposite sides (ordinarily from below and from above) and advancing in the same direction and at uniform speed, they carry the work forward in intended course. Fig. II shows the work T (which here may be understood to be a length of glass tubing) so engaged by the two chains. The chains throughout their co-operating reaches are held to the work by backing plates 3, and the chains are equipped with rollers 4, for travel upon the backing plates.

It is usual in such apparatus, when provided for the conveyance of such material as glass in hot and soft condition, to provide pads of pliant sheet material, typically asbestos, secured to the chains, by means of metal clips. The pads immediately engage the work and hold it securely. Hitherto there has been some difficulty in the employment of pads of sheet material, due to the tendency of the pads to ravel at their edges. In order to prevent such raveling, the marginal portions of the metal clips have been clinched upon the edges of the pads, but the metal clips so used are likely to mar the work. I overcome this difficulty by using a web of asbestos in the form of a strip or ribbon of suitable width, having opposite selvage edges. I cut the ribbon into sections, and apply the sections transversely upon the chains, so that in the direction of chain travel the forward and rear edges of the pads are selvage edges. By virtue of this refinement, it becomes practical so to secure the pads upon the chain that there is no possibility of the sheared edges of the pads raveling, and there is no danger of the metal clips engaging and marring the work.

The sprocket chain is of usual construction, and consists of links 5, 6 articulated by pins 7 and spaced apart by sleeves 17. Alternate pins are prolonged, and carry the rollers 4, pair by pair, and the pins that carry the rollers are prolonged beyond the rollers, as shown in Fig. II. Upon sequent pins and, as here shown, upon the prolonged ends of two immediately successive roller-carrying pins 7 (that alternate with pins not so prolonged) saddles 8 are mounted; and these saddles, borne each by two pins, are provided in immediate succession, so that there is one saddle for every succeeding two pairs of pin-borne rollers.

The saddles 8 are formed of sheet steel, and are identical. Each consists of a seat 9 (Fig. II) from which along opposite edges skirts depend. To the skirts the numeral 8 is immediately applied. The saddle is, in the direction of chain extent, of a length substantially equal to the centre-to-centre distance between the successive roller-carrying pins 7; the skirts of the saddle are prolonged and at their edges are provided with notches 10. In assembly the notches 10 take over the prolonged ends of the pins 7.

Upon the seat of each saddle a pad 11 of sheet asbestos (or equivalent material) is placed. It covers the seat longitudinally, and at the sides overlaps the faces of the opposite skirts, as shown in Fig. II. The pad is cut from a ribbon of asbestos fabric, and it is the sheared edges of the ribbon that lie upon the faces of the skirts and the saddle. Notches 12 are cut in the sheared edges of the pads for facility of application and removal. The selvage edges of the ribbon extend transversely of the chain, and it is to be noted (Fig. III) that the ribbon of which the pad is cut is greater in width than the extent of the seat of the saddle in the direction of chain travel, with the effect that the selvage edges of the pad in service will curl inward upon the forward and rear edges of the saddle seat and insure that the work shall not come into contact with such edges.

The structure is completed by two clips 13 and a bolt 14. The clips are identical; they are formed of sheet steel; they are shaped to overlie the skirts of the saddle, and, bolted in place, to clamp to the faces of the skirts the edges of the asbestos pad overlapped upon them. The clips at the edges remote from the pad seat are in-turned, as indicated at 16, and in the assembly such in-turned edges extend along the edges of the skirts of the saddle. Tongues 15 extend from the in-turned edges of the clips and overlie the inner faces of the skirts of the seat. The structure is shown in section in Fig. II. It will be observed that the in-turned edges 16 of the clips afford in combination with the notches 10 in the skirts of the saddle complete encirclement of the ends of the pins 7; that the ends of the pins are housed within the saddle structure. When the bolt is loose the clips 13 may swing pivotally upon (but without separation from) the edges of the skirts, allowing removal and replacement of the pad 11; and when the bolt is tightened the pad is clamped to place and the pivotal engagement alluded to is made firm and secure.

It will be perceived that the pad-securing means, mounted upon the sprocket chains, lend themselves to sprocket-chain travel, and that a single bolt suffices for releasing and securing the pad 11, as replacement may be necessary, without otherwise disturbing the assembly, and for securing the whole to the sprocket chain. Additionally, it will be noted that the entire effective area of each pad is unobstructed—no portions of the metal clips extend upon the effective surface of the pad where it might damage the surface of the work.

I claim as my invention:

1. In conveying apparatus that includes a travelling endless chain formed of links articulated upon pivot-pins, means for mounting upon the chain a work-engaging pad of pliant sheet material, such means including a saddle comprising a seat with opposite skirts, the skirts at their edges adapted to be engaged by sequent pivot-pins of the chain, two clips adapted to engage the margins of a pad of sheet material laid upon the seat of the saddle and overlying the skirts thereof, and a bolt adapted simultaneously to engage said clips and to constitute with them a clamp for the pad so applied, the said clips being adapted in the assembly to be shaped around the edges of the skirts of the saddle.

2. In conveying apparatus that includes a travelling endless chain formed of links articulated upon pivot-pins, means for mounting upon the chain a work-engaging pad of pliant sheet material, such means including a saddle comprising a seat and opposite skirts, the skirts at their edges being provided with notches adapted in the assembly to take over the projecting ends of sequent pivot-pins of the chain, two clips adapted to engage the margins of a pad of sheet material laid upon the seat of the saddle and overlying the skirts thereof, and a bolt adapted simultaneously to engage said clips and to constitute with them a clamp for the pad so applied, the said clips in the assembly being shaped over the edges of the skirts and closing the notches in the edges of the skirts.

3. In conveying apparatus that includes a travelling endless chain made up of links articulated upon pivot pins, means for mounting upon the chain a work-engaging pad of pliant sheet material, such means including a saddle comprising a seat with opposite skirts, two clips, and a clamping bolt, the skirts of the saddle and the applied clips forming housings for the opposite ends of two sequent pivot pins of the chain, and the bolt cooperating with the clips to clamp to the skirts of the saddle the margins of a pad spread upon the seat with margins overlying the skirts of the saddle.

4. In conveying apparatus that includes a travelling endless chain formed of links articulated upon pivot-pins, means for mounting upon the chain a work-engaging pad of pliant sheet material, such means including a saddle and means for uniting the saddle to the articulated chain structure, said pad being formed of prefabricated strip of pliant material having selvage edges, such pad being spread transversely upon the saddle, whereby the forward and rear edges in the direction of chain travel are selvage edges, the means for uniting the saddle to the articulated chain structure including two clips adapted to engage the edges of the saddle and to extend upon the margins of the pad overlying the sides of the saddle, and a bolt securing the assembly of saddle pad and clips.

HAROLD H. SNYDER.